Figure 1:
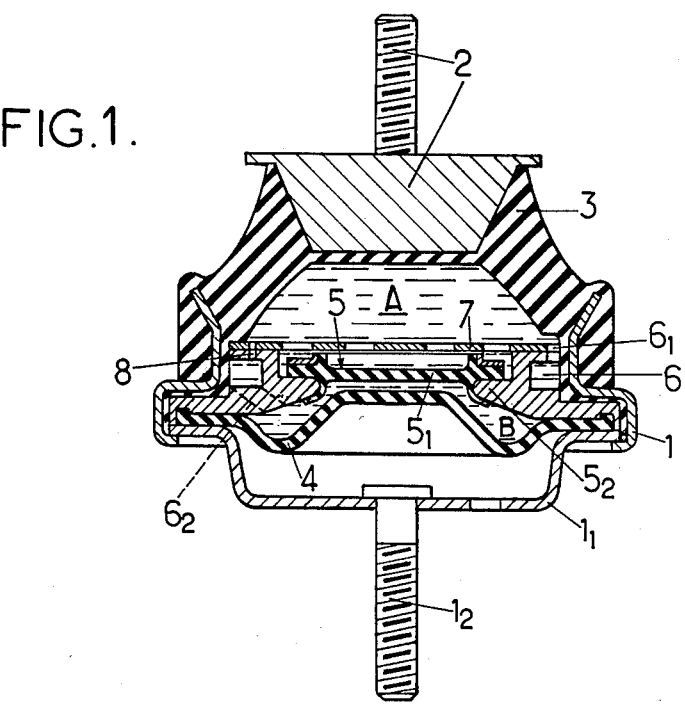

United States Patent [19]

Bodin

[11] Patent Number: 4,739,978
[45] Date of Patent: Apr. 26, 1988

[54] HYDRAULIC ANTIVIBRATION SUPPORT

[75] Inventor: François Bodin, Jallans, France

[73] Assignee: Hutchinson, Paris, France

[21] Appl. No.: 905,389

[22] PCT Filed: Dec. 24, 1985

[86] PCT No.: PCT/FR85/00373
§ 371 Date: Aug. 12, 1986
§ 102(e) Date: Aug. 12, 1986

[87] PCT Pub. No.: WO86/03813
PCT Pub. Date: Jul. 3, 1986

[30] Foreign Application Priority Data

Dec. 24, 1984 [FR] France .................... 84 19790

[51] Int. Cl.$^4$ ............................................. F16M 7/00
[52] U.S. Cl. .................. 267/140.1; 188/320; 267/64.27
[58] Field of Search .............. 188/320; 267/140.1, 267/64.23, 64.27

[56] References Cited

U.S. PATENT DOCUMENTS 4,618,128 10/1986 Hartel et al. .............. 267/140.1
4,657,232 4/1987 West ............................ 267/140.1

FOREIGN PATENT DOCUMENTS 98331 11/1982 European Pat. Off. .
68395 9/1983 European Pat. Off. .
58-72741 7/1983 Japan .
2041485 2/1979 United Kingdom .
2132311 7/1984 United Kingdom .

Primary Examiner—Joseph Falk
Attorney, Agent, or Firm—Larson & Taylor

[57] ABSTRACT

It relates to a hydraulic antivibration support interposed between a chassis and a vehicle engine, comprising a working chamber A and a compensation chamber B filled with liquid and joined together by a throttled passage (6) constituted by a "column" in a circular arc hollowed in the annular seat ($5_2$) of a central deformable partition ($5_1$). To increase the number of oscillatory phenomena which can be damped in excellent manner by the "column" effect, there is provided at least one small hole (8) joining one of the chambers A to a point of the throttled passage (6).

8 Claims, 1 Drawing Sheet

U.S. Patent

Apr. 26, 1988

4,739,978

HYDRAULIC ANTIVIBRATION SUPPORT

The invention relates to antivibration devices designed to be inserted for the purposes of support and damping between two rigid elements, the damping involving the driving of a liquid through a throttled passage, and the relative movements to be damped of the two rigid elements comprising on the one hand oscillations of relatively large amplitude (that is to say greater than a mm.) at relatively low frequency (that is to say less than 20 Hz) and on the other hand vibrations of relatively low amplitude (that is to say less than 0.5 mm.) at relatively high frequency (that is to say higher than 20 Hz).

By way of non-limiting example, it is indicated that such supports can be mounted between a vehicle chassis and the engine of this vehicle, the relatively ample oscillations to be damped being those created by the irregularities and variations in slope of the ground during the travel of the vehicle over this ground and the vibrations to be damped being those due to the operation of the engine.

The invention relates more particularly, among supports of the type concerned, to those which are constitued by a fluid-tight housing interposed between the two rigid elements, said housing comprising two rigid parts firmly securable respectively with the two rigid elements, an annular elastic supporting wall joining one of the two rigid parts in fluid-tight manner to a rigid annular armature forming part of the second part, a flexible diaphragm borne in sealed manner by the annular armature, a deformable partition also borne in fluid-tight manner by the annular armature between the support wall and the flexible diaphragm and dividing the inside of the enclosure bounded by this wall and by this diaphragm into two chambers, namely a working chamber on the side of the wall and a compensation chamber on the side of the diaphragm, these two chambers communicating with each other through the above throttled passage, means for limiting to a low amplitude, that is to say less than 1 mm, the deformations of the partition in the axial direction perpendicular to its middle plane, and a liquid mass filling the two chambers as well as the throttled passage.

With such a support, a vibration of high frequency and of low amplitude exerted between the two rigid elements generates corresponding relative movements between the two rigid parts, which are transmitted to the deformable partition by the liquid contained in the working chamber and manifested by a rapid succession of alternate deformations of this partition perpendicular to itself, of amplitude less than the maximum possible value: the dimensions of the partition are selected to be sufficient so that the latter can thus absorb the movements indicated without the liquid being driven back through the throttled passage in opposite directions in synchronism with the vibration.

On the contrary, for oscillations of higher amplitude and of lower frequency, the amplitude of the corresponding deformations of the partition reaches its maximum possible value and the liquid is then driven back through the throttled passage, which ensures the hydraulic damping of this liquid through its putting into resonance in this passage, at least for certain values of said frequency connected with the dimensions with said passage.

The invention relates more particularly still, among supports of the type concerned, to those for which the throttled passage is a channel which defines a liquid mass assimilatable to a column of relatively large diameter and length, this channel being hollowed in the annular armature of the support and extending around a circular arc comprised between 45° and 350° around the deformable partition, the two ends of the channel being terminated by unions which open respectively into the two chambers.

In known embodiments of said supports, the channel concerned is unique so that the ratio R between its length and its diameter, a ratio generally comprised between 2 and 100, is determined once and for all.

Now experience shows that the resonance frequency F of the liquid column contained in such a channel is associated with said ratio R as well as the amplitude A of the oscillations to be damped.

It is hence possible only to damp correctly, with the known support mentioned, a well-determined oscillatory phenomenon, corresponding to a well-determined frequency and amplitude.

Thus, for example, if the frequency F selected to define the ratio R is that, called shaking, of the order of 10 Hz, which corresponds to the most unpleasant trepidations transmitted to the seats of the users during the running of the vehicle concerned, only the oscillations corresponding to this frequency $F_1$ and to well determined amplitudes $A_1$, for example above a threshold of the order of 0.3 mm, will be damped under optimal conditions.

In other words, the supports concerned do not allow the damping at best of the oscillations corresponding to the frequency $F_1$ but at amplitudes other than $A_1$, for example the order of 0.1 mm and/or at the sames amplitudes $A_1$, but at other frequencies than $F_1$, for example at a frequency of the order of 25 Hz, as is the case for the vibrations emitted on idling by certain diesel engines.

It is an object of the invention to widen the damping capacity of the supports concerned by extending it to a higher number of oscillation frequencies and/or amplitudes.

To this end, the supports of the type concerned are essentially characterized according to the invention in that they have, to establish the communication between the two chambers, at least one second throttled passage constituted by a small hole joining one of the two chambers to a point of the first passage.

In preferred embodiments, recourse is had in addition to one and/or other of the following features:

the above point of the first passage is in the vicinity of the end, of the latter, joined to the other chamber, the second passage comprises two holes of the above type joining respectively the two chambers to two points, distinct or merged, of the first passage, each of the constituent holes of a second passage is oriented parallel with the axis of the annular armature.

The invention comprises, apart from these main features, certain other features which are preferably used at the same time and which will be more explicitly considered below.

In the following, preferred embodiments will be described with reference to the accompanying drawing taken of course as non-limiting.

FIG. 1 of this drawing, shows in diagrammatic axial section an antivibration hydraulic support constructed according to the invention.

Figure 2:
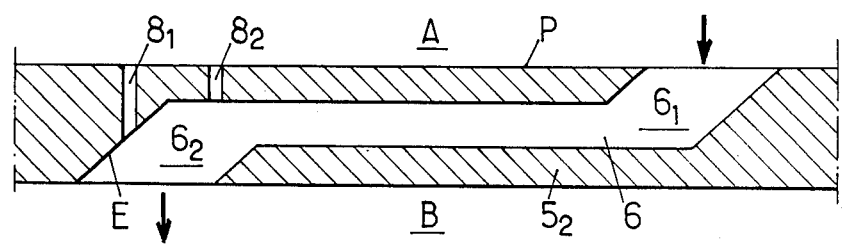
Figure 3:
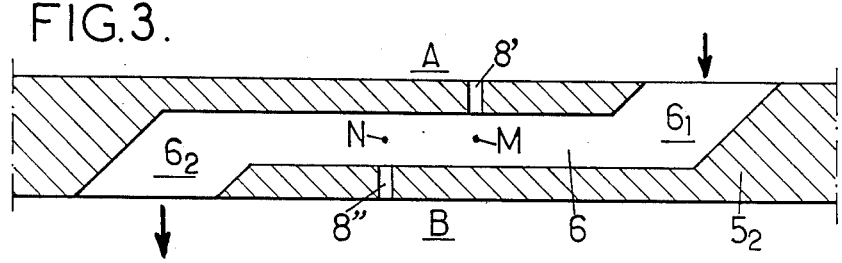

FIGS. 2 and 3 are developed sections of the first column comprised by such a support, said sections showing the locations of the second columns constructed according respectively to two different modifications of the invention.

The support concerned is designed to be inserted vertically between a rigid carrier member which will be assumed in the following to be a vehicle chassis and a rigid supported member which will be assumed in the following to be an internal combustion engine.

This support is in the general form of a sealed housing comprising, in manner known in itself:

an annular armature 1 joined below to a perforated tank $1_1$ itself fast to a central bolt $1_2$ allowing assembly to the chassis of the vehicle, a rigid cap 2 shown here in the form of a bolt of which the threaded portion extends upwards, said bolt being rigidly securable with the housing of the engine, a thick and fluid-tight frustoconic wall 3 of rubber or similar elastic material adhering to the armature 1 and to the cap 2 and adapted to resist elastically axial compression and transverse flexion, and a fluid-tight flexible diaphragm 4 whose periphery is fixed in fluid-tight manner to the annular armature 1.

A deformable partition 5 divides the inside of the housing so defined into two chambers A and B both filled with a damping liquid, namely a working chamber A, positioned on the side of the wall 3 and a compensation chamber B, positioned on the side of the diaphragm 4.

The partition 5 is constituted by an elastic sheet $5_1$ mounted on an annular seat $5_2$ which is firmly fastened to the annular armature 1.

The movements of this diaphragm are limited in any desirable manner, for example by the incorporation of a metal gauze.

The communication of the liquid between the two chambers A and B is effected through a constantly open throttled passage 6.

This passage is constituted by a channel hollowed inside the seat $5_2$ and extending along a circular arc comprised between 45° and 350°, of which channel the two ends open respectively into the two chambers A and B through two connections $6_1$ and $6_2$.

Finally, there is advantageously provided in the chamber A a perforated plate 7 extending parallel to the diaphragm $5_1$, at a short distance from the latter and supported at its periphery on the seat $5_2$.

As indicated above, the support which has just been described enables the damping:

on the one hand, of oscillations at relatively low frequency $F_1$ and of relatively large amplitude $A_1$, on the other hand, of vibrations at relatively high frequency $F_2$ and of relatively small amplitude $A_2$.

The frequency $F_1$ and the amplitude $A_1$ are essentially connected with the ratio $R_1$ between the length and the diameter of the liquid column $C_1$ contained in the passage 6.

To permit an excellent damping, by the "column" effect, of oscillations having a frequency ($F_1'$, $F_1''$ . . .) and/or an amplitude ($A_1'$, $A_1''$ . . .) distinct from those indicated above, according to the invention, there is provided at least one second column ($C_1'$, $C_1''$ . . .) joining one of the chambers to a point of the first column, the ratio length/diameter of this second column being determined as a function of the new parameters (frequency and/or amplitude) concerned.

In the embodiment illustrated in FIG. 1, this second column is unique and is defined by a small hole 8 joining the chamber A to the zone $6_2$ of the first column, which opens into the chamber B.

The diameter of this hole is generally comprised between 0.5 and 6 mm and its length is generally comprised between 1 and 10 mm.

Experience has shown that with a principal column 6 having a cross section of the order or 35 mm$^2$ and a length of the order or 60 mm, the presence of a circular hole 8 at the place indicated above, said hole having a diameter of 4 mm and a length of 4 mm, had the effect:

on the one hand, of considerably reducing the rigidity of the support for frequencies greater than 30 Hz and in particular for those of the order of 50 Hz, for which the reduction observed is of the order of 50%, and on the other hand of equalizing at the same frequency value, of the order of 40 Hz, the maximum damping effectiveness of the corresponding support respectively at "large" amplitudes—namely greater than 0.3 mm—and at "small" amplitudes—less than 0.3 mm—, whereas in the absence of said hole the corresponding maxima at these various amplitudes were spread over a range of frequencies comprising between 32 and 38 Hz.

Values of 2 mm for the diameter of the hole 8 and of 2 mm for its length also give favorable results for the use mention above of support for an internal combustion engine.

The very small lengths indicated above for the hole 8—lengths more than ten times smaller than the length of the "first column" 6—are due to the fact that this hole can be pierced in the axial portion, which is relatively thin, of the annular seat $5_2$, which separates the first column 6, hollowed in said seat, from the chamber A or B into which said hole 8 opens, as is clearly visible in FIG. 1.

Instead of providing a single small hole 8 in the vicinity of one end of the principal column 6, it is possible to provide a plurality of them, which permits diversification of the damping performance of the support.

In the embodiment shown diagrammatically in FIG. 2, these small holes are two in number denoted respectively by the references $8_1$ and $8_2$ and having respectively identical small cross sections, but different lengths, being pierced respectively between on the one hand a flat surface P of the armature $5_2$, perpendicular to the axis of this armature and situated on the side of the chamber A and on the other hand a stepped and/or oblique surface E opposite said flat surface P and bounding in part the connection $6_2$ which opens into chamber B.

Instead of making the hole constituting the second column open into one of the ends of the first column, which amounts to forming the second column in parallel over the whole of the first column, it is also possible to make said hole open at an intermediate point of the first column, which forms this hole in parallel over only a portion of said first column.

According to another modification, the second column is made to comprise two holes of the type defined in the preceding paragraph, connecting the two chambers A and B to respectively two points merged or separate of the first column.

It is this latter hypothesis which has been illustrated in FIG. 3, for which the two holes 8' and 8" join respectively two points M and N of the first column to chamber A and chamber B respectively.

The second column can then be considered as the whole of the liquid volume contained successively in the hole 8', in the section MN of the first column and in the hole 8''.

In each case, the choice of the location and of the dimensions of the holes defining the second column are determined by knowledge of the ratio between the length and the diameter (or the cross section) of this second column, which ratio is connected with the frequency and the amplitude of the oscillatory phenomenon that it is desired to damp best by the placing in resonance of the liquid contained in said second column.

As a result of which, and whatever the embodiment adopted, there is provided finally an antivibration hydraulic support whose constitution and operation results sufficiently from the foregoing.

This support has over those previously known a certain number of advantages and in particular the following:

it ensures an excellent damping by resonance or "column" effect of several oscillatory phenomena having distinct frequencies and/or amplitudes: thus a support with several columns according to the invention enables damping in excellent manner, and this by the "column" effect, both of certain vibrations with relatively high frequency (such as those due to the engine idling and having a frequency of 25 Hz and an amplitude less than 0.5 mm) and certain shaking oscillations (having a frequency of 10 Hz and an amplitude greater than 0.5 mm); the "column" effect can thus assist the antivibration effect previously ensured by the vibrations of the deformable partition;

the cost price of the support concerned is not higher than that of comparable supports comprising a single column considering that the small constituent holes of the second columns are hollowed in parts obtained by moulding.

As is self-evident, and as results besides already from the foregoing, the invention is in no way limited to those of its types of application and embodiments which have been more especially envisaged; it encompasses on the contrary, all modifications.

It should be pointed out here that the multiplicating of the liquid "column" has already been proposed before the invention, but solely for supports in which the central partition separating the support into two chambers is rigid and fixed, one at least of the columns being hollowed then in this rigid central partition.

I claim:

1. Antivibration device for insertion between two rigid members for the purposes of support and damping and constituted by a fluid-tight housing interposed between the two rigid elements, said housing comprising first and second rigid parts firmly securable respectively to the two rigid elements, a rigid annular armature forming part of said second part, an annular elastic support wall connecting, in fluid-tight manner, one of the rigid parts to said rigid annular armature, flexible diaphragm borne in fluid-tight manner by the annular armature, a deformable partition also borne in fluid-tight manner by the annular armature between the support wall and the flexible diaphragm and dividing the inside of the enclosure bounded by this wall and by said diaphragm into two chambers, said chambers comprising a working chamber on the side of the wall and a compensation chamber on the side of the diaphragm, means defining a throttled passage by which said two chambers communicate with each other, means for limiting to a low amplitude less than 1 mm, the deformation of the partition in the axial direction perpendicular to the middle plane thereof, and a liquid mass filling the two chambers as well as the throttled passage, said throttled passage comprising a channel of relatively large diameter and length formed in the annular armature and extending over a circular arc comprised between 45° and 350° around the deformable partition, the two ends of the channel being terminated by connections which open respectively into the two chambers, wherein the improvement comprises at least one further throttled passage, constituted by a small hole connecting one of the two chambers to a point of the first passage, for establishing communication between the two chambers.

2. Antivibration device according to claim 1, characterized in that the diameter of the small hole is relatively small and comprised between 0.5 and 6 mm.

3. Antivibration device according to claim 2, characterized in that the diameter of the small hole is between 1 and 4 mm.

4. Antivibration device according to claim 1, characterized in that the length of the small hole is relatively short and comprised between 1 and 10 mm.

5. Antivibration device according to claim 4, characterized in that the length of the small hole is between 2 and 4 mm.

6. Antivibration device according to claim 1, characterized in that the said point of the first passage is in the vicinity of the end, of the latter connected to the other chamber.

7. Antivibration device according to claim 1, characterized in that the second passage comprises two of said small holes connecting respectively the two chambers to two separate points of the first passage.

8. Antivibration device according to claim 1, characterized in that the second passage comprises two of set small holes connecting respectively the two chambers to two merged points of the first passage.

* * * * *